Jan. 10, 1950     L. R. JACOBS ET AL     2,493,877

DUMPING MECHANISM FOR FARM VEHICLES

Filed Sept. 24, 1947     2 Sheets-Sheet 1

Inventor
Leroy R. Jacobs
Guy R. Halterman
By W. S. McDowell
Attorney

Jan. 10, 1950      L. R. JACOBS ET AL      2,493,877
DUMPING MECHANISM FOR FARM VEHICLES
Filed Sept. 24, 1947      2 Sheets-Sheet 2

Inventor
Leroy R. Jacobs
Guy R. Halterman
By W. S. McDowell
Attorney

Patented Jan. 10, 1950

2,493,877

UNITED STATES PATENT OFFICE 2,493,877

DUMPING MECHANISM FOR FARM VEHICLES

Leroy R. Jacobs and Guy R. Halterman, Yellow Springs, Ohio

Application September 24, 1947, Serial No. 775,912

4 Claims. (Cl. 298—20)

1

This invention relates to dumping vehicles and particularly to a mechanism for the tipping of a vehicle body, such as a wagon bed, relative to the running gear and chassis. It comprises an improvement over the dump bed construction for vehicles of our co-pending application for Letters Patent, Serial No. 752,420, filed by us on June 4, 1947.

Although the mechanism of our invention is adaptable to many types of vehicles it is of particular usefulness in the case of farm wagons. Where a lifting device is carried by a chassis, and is designed to lift therefrom the vehicle body, it is necessary that the chassis be sufficiently rugged to withstand the strain. In the case of farm wagons however, it is desirable to have the underparts as light as possible to keep the overall weight within reasonable limits and to provide a degree of flexibility when traversing uneven ground.

An object of the present invention, therefore, is to provide a lifting mechanism for the tipping of a wagon bed which will react, not upon the wagon chassis, but upon the ground itself.

Another object is to provide such a lifting mechanism in as simple a form as possible, without using gearing, screw threaded members, or nicely fitted bearings, all of which necessitate frequent attention when exposed to the elements.

These objects we accomplish by the provision of a pair of rigid struts, the lower ends of which are adapted to rest upon the ground and the upper ends of which carry rollers which coact with trackways beneath the wagon bed. These upper ends may be moved forcibly, by a block and tackle device, rearwardly from an idle position at the forward end of the bed. As the struts assume an increasingly vertical position they force the forward end of the bed upwardly, thus raising the bed about its pivots at the rear of the chassis until the desired dumping angle is reached.

An ancillary object is to provide adjustable means whereby the height of the horizontal wagon bed, and its rearward pivots, may be chosen either to conform to that of a loading platform, to clear a certain height of growing crops, or to raise the rear end, when in dumping position, above a particular load receiver.

Other objects and advantages will be made apparent by the following specification and claims and by the appended drawings.

In the drawings,

Fig. 1 is a longitudinal, medial section through a farm wagon incorporating the dumping mechanism of this invention;

2

Figure 1:
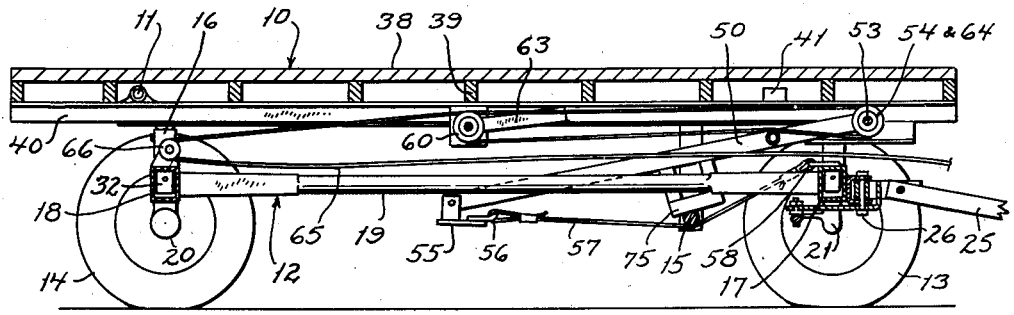

In the drawings a preferred embodiment of our invention is illustrated as applied to a flatbed farm wagon. The wagon comprises a bed 10 pivoted at 11 on a chassis 12, the latter being provided with front and rear wheels 13 and 14, respectively.

The particular design of the chassis is of little importance to the invention except insofar as it provides the pivotal support 11 for the bed, a cross-bar 15, and extensible members 16 as will later be described. In the chassis illustrated, front and rear cross-members 17 and 18, respectively, are interconnected with a thrust tube 19. Bearing housings 20 for the rear axles are rigidly secured to the cross-member 18 while those for the front axles are pivoted in caster fashion at 21 on the cross-member 17.

A wagon tongue 25 is pivotally secured, at 26 to the member 17 and is interconnected with the dirigible front axles in any well known manner.

Figure 3:
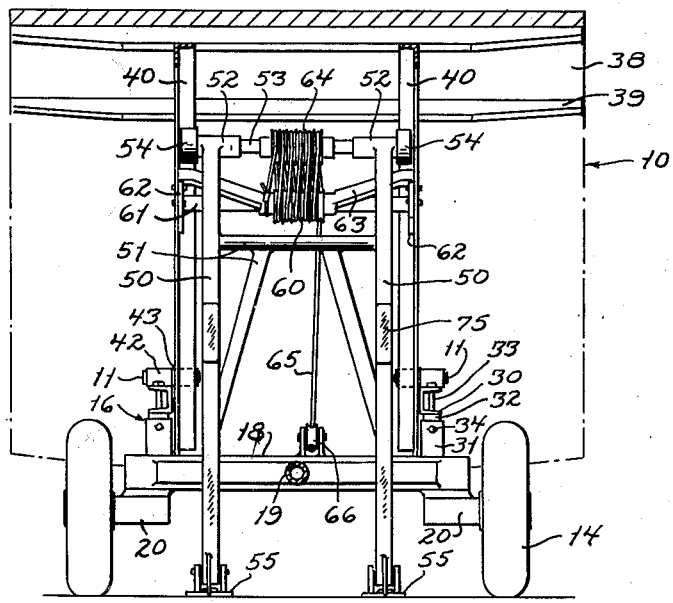
Fig. 3 is a transverse, vertical section taken on the plane 3—3 of Fig. 2.
Figure 5:
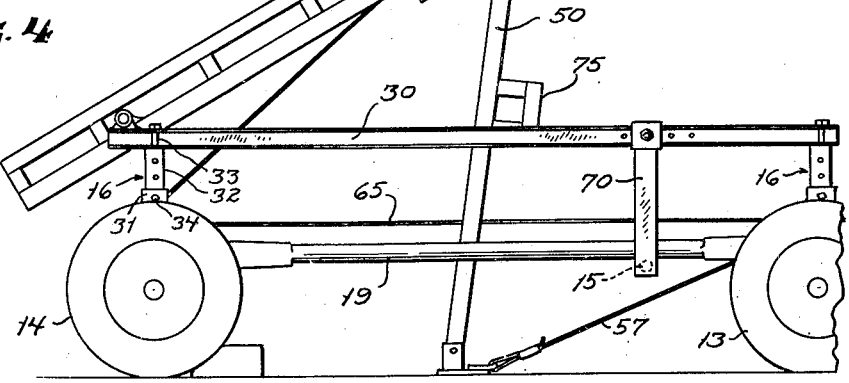
Fig. 5 is a view similar to Fig. 2 but showing the telescopic chassis supports extended to elevate the position of the pivotal support.

A pair of longitudinal, bed-supporting sills are provided by channels 30 which are carried by the previously mentioned extensible members 16. Each of these latter, as best seen in Figs. 3 and 5, comprises a pair of telescoping members, preferably cylindrical, the lower of which, shown at 31, is rigidly secured at one of the outer ends of the cross-members 17 or 18. The upper member 32 of each pair is detachably secured, as by a bolt 33, near an end of one of the sills and may be held at any selected position, relative to the lower member, as by bolts 34 which may occupy any of a series of holes through the parts. In its lower positions the inner member 32 may pass through an opening in the cross-member 17 or 18 into the hollow interior, as shown in Fig. 1. If a given length of member 32 is insufficient to provide a desired height of sill, it may be replaced by a larger one.

The bed construction is likewise immaterial to the invention, beyond the provision of a pair of longitudinal stringers which provide trackways for the lifting mechanism and the provision of a bearing support for a set of sheaves. In the wagon bed illustrated, floorboards 38 are secured to a series of transverse beams 39. The stringers mentioned preferably comprise a pair of angle-irons 40. These are secured to the transverse beams 39 at such a spacing that they nest easily within the sills 30 of the chassis. In the lowered, transporting position of the bed the beams 39 rest upon the sills and the downwardly extending flanges of the angle-irons 40 lie immediately adjacent the webs of the respective sill channels to prevent relative transverse motion of the bed and chassis. Guide plates 41 may be provided on the sills to ensure proper positioning of the descending bed.

Figure 2:
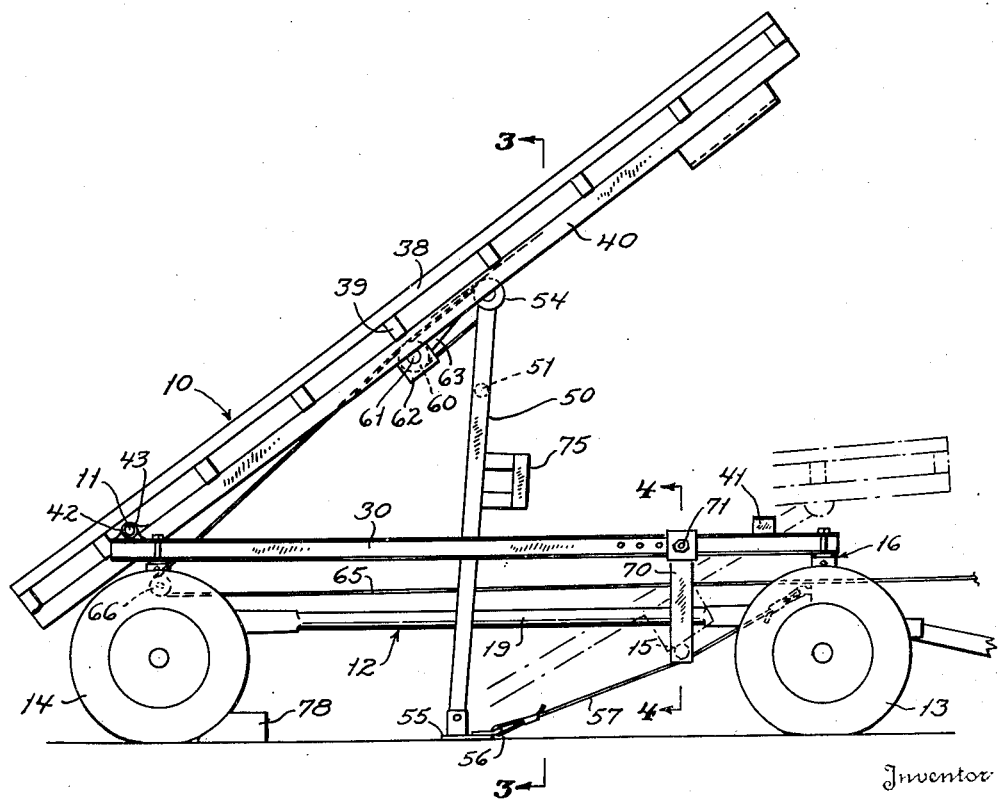
Fig. 2 is a side elevational view of the same, with the wagon bed raised to dumping position.

The pivot pins 11 are conveniently carried in bearings 42 and 43 welded or otherwise secured to the sills and stringers, respectively, as seen in Figs. 2 and 3.

To raise the bed about its pivots 11 we provide a pair of struts 50 interconnected and braced as at 51. Bearings 52 at the upper ends of the struts carry a cross-shaft 53 for a pair of rollers 54. The latter are adapted to engage the inwardly extending flanges of the stringers 40 and thus to raise and support the bed above the sills.

To the lower ends of the struts 50 are pivoted ground-engaging shoes 55, to each of which is tied, as at 56, a cable 57. The cables extend forwardly to an anchorage 58 on the front cross-member 17 of the chassis and thus limit the rearward position of the lower strut ends.

With the struts supported and pivoted upon the ground, the bed may be raised and lowered by altering the position of their upper ends along the stringers. A block and tackle arrangement is provided to produce the relative movement. For this purpose a set of sheaves 60 is carried by a shaft 61 mounted in hangers 62 on the stringers, the great force exerted upon them being transmitted to the stringers by braces 63. A similar set of sheaves 64 is carried by the strut cross-shaft 53. A cable 65 is anchored to one of the shafts and reeved about the sheaves. The cable thence passes rearwardly to a pulley 66 carried by the chassis member 18 and again forwardly to an appropriate power source.

Figure 4:
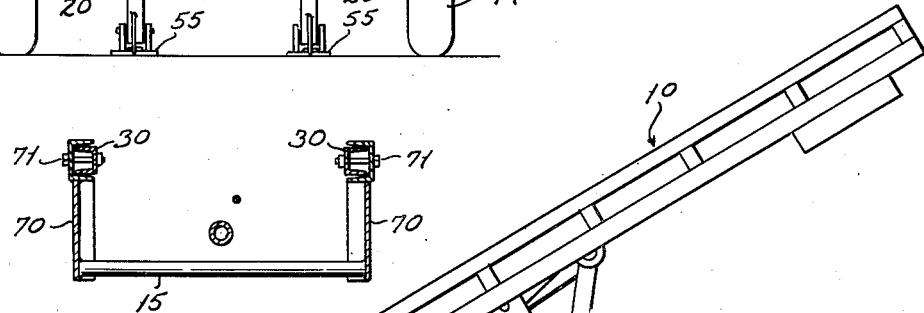
Fig. 4 is a similar section taken on the plane 4—4 of Fig. 2 and omitting parts beyond the plane.

Means are provided to raise the struts from the ground, so as to clear the terrain, when the bed is returned to horizontal, transporting position. This is the function of the cross-bar 15, previously mentioned. The bar is carried, as best seen in Figs. 2 and 4, by depending brackets 70 selectively positionable on the sills 30 and bolted thereto as at 71. As the cable 65 is payed out and the bed is allowed to descend, the struts 50 assume a smaller and smaller angle to the horizontal until, just before the bed beams 39 reach the sills 30, the struts engage the bar 15. Continued descent of the heavy bed then rocks the struts on the bar and raises the lower ends to the position illustrated in Fig. 1.

At the start of a subsequent dumping operation the initial raising of the bed is accomplished by a pivoting of the struts about the bar 15. Were the bar at a sufficient height to engage the body of the struts themselves, an exhorbitant amount of force would need to be applied to the sheaves because of the low strut angle and the consequent mechanical disadvantage. We have, therefore, provided extensions 75 on the struts which allow the bar 15 to be lowered to the position illustrated. As the extensions pivot upon the bar the effective strut angle is in this manner increased, resulting in a decrease in the initial mechanical disadvantage.

As the lifting operation progresses, the strut angle increases until, at the broken-line position in Fig. 2, the shoes 55 engage the ground. The extensions, at this time, withdraw from the bar 15 and the struts thenceforth pivot upon the shoes.

It will be noted that when the sills are raised on the extensible supports 16, the bar 15 is carried with them. To maintain its point of engagement with the extensions at an advantageous position, the brackets 70 are made adjustable along the sills as previously mentioned.

Where the prime mover is a tractor, for example, provided with a winch, the wagon may be left hitched and the winch used to pull the cable. In the usual case, however, the prime mover, whether horses or vehicle, is unhitched and the cable 65 attached thereto. The wagon wheels are then chocked, as at 78 in Fig. 2, and the prime mover driven off to pull the cable and effect the dumping.

It will be understood that the embodiment illustrated and described is chosen as an example only and that numerous changes and modifications may be made in the dumping mechanism without departing from the spirit and scope of our invention.

We claim:

1. In a vehicle having a chassis, a body, and a pivot therebetween, a dumping mechanism for the body comprising a strut, means for pivoting one end of the strut on the ground forwardly of the pivot, means for forcibly sliding the other end of the strut along the bottom of the body from the forward end thereof and for allowing the weight of the body to return the said other end to the said forward end, an abutment carried by the chassis across the downward path of the strut whereby the strut is rocked thereon to lift the first mentioned end from the ground during the final portion of the body descent, and means for limiting the rearward movement of the first mentioned end.

2. In a vehicle having a chassis, a body, and a rearwardly positioned pivot therebetween, a dumping mechanism for the body comprising a strut, means for pivoting one end of the strut on the ground forwardly of the pivot, means for forcibly sliding the other end of the strut along the bottom of the body rearwardly from the forward end thereof and for allowing the weight of the body to return the said other end to the said forward end, a surface on the strut intermediate its ends and displaced forwardly a substantial distance from a line joining the ends, an abutment on the chassis adapted to be engaged by said surface during the latter portion of the body return and during the initial portion of the body lifting, whereby the strut is rocked about the abutment to lift its said one end from the ground and whereby a substantial moment arm is obtained for the initial forcible sliding of the said other end, and means for limiting rearward movement of the said one end.

3. A dumping vehicle comprising a body, a chassis, a body support, a pivot between the body and support, extensible means for mounting the support on the chassis whereby the height of the body and pivot may be adjusted, a strut, means for pivoting one end of the strut on the ground forwardly of the pivot, means for forcibly sliding the other end of the strut along the bottom of the body from the forward end thereof and for allowing the body weight to return the said other end to the said forward end, an abutment intersecting the downward path of the strut whereby the strut is rocked thereon to lift the first-mentioned end from the ground during the final portion of the body descent, means for limiting the rearward movement of the first-mentioned end, and an adjustable mounting for the abutment on the body support to compensate for adjustments in height of the latter.

4. In a vehicle having a chassis, a body, and a pivotal connection between said chassis and body providing for swinging movement of the latter in a vertical plane, a raising and lowering mechanism for the body comprising a strut having a lower end adapted for engagement with the ground during body raising and lowering operations, a tension member tying the ground-engaging end of said strut to one end of said chassis forwardly of its ground-engaging end, a longitudinally extending guide fixed to the bottom of said body and in which a normally upper end of said strut is received for sliding movement, and cable means passing around guides carried by the upper end of said strut, the under art of said body and said chassis for applying power directly to said strut to cause swinging movement thereof about its ground-engaging end, whereby to raise and lower said body.

LEROY R. JACOBS.
GUY R. HALTERMAN.

REFERENCES CITED

The following references are of record in the file of this patent:

FOREIGN PATENTS

| Number | Country | Date |
|---|---|---|
| 476,402 | Great Britain | Dec. 8, 1937 |
| 553,174 | France | of 1923 |